United States Patent [19]

Buddecke

[11] 4,127,919
[45] Dec. 5, 1978

[54] COMBINED CATFISH KILLER AND HOLDER

[76] Inventor: William A. Buddecke, 820 Paul, Florissant, Mo. 63031

[21] Appl. No.: 733,098

[22] Filed: Oct. 18, 1976

[51] Int. Cl.² ............................................. A22C 25/06
[52] U.S. Cl. ............................................. 17/70; 17/76
[58] Field of Search ........................... 17/68, 70, 76, 74

[56] References Cited

U.S. PATENT DOCUMENTS

| 189,966 | 4/1977 | Temple | 17/76 |
|---|---|---|---|
| 332,403 | 12/1885 | Leduc | 17/76 |
| 845,521 | 2/1907 | Carlson | 17/76 |
| 1,741,015 | 12/1929 | Delonde | 17/76 |
| 2,136,816 | 11/1938 | Frazier | 17/76 |
| 2,523,736 | 9/1950 | Swetzik | 17/70 |
| 2,725,592 | 12/1955 | Pieper | 17/70 |
| 2,738,546 | 3/1956 | Gaetti et al. | 17/76 |
| 2,932,849 | 4/1960 | Missman | 17/70 |
| 3,015,841 | 1/1962 | Revtz | 17/70 |

FOREIGN PATENT DOCUMENTS 605774 11/1934 Fed. Rep. of Germany ............. 17/70

Primary Examiner—Russell R. Kinsey
Assistant Examiner—Paul J. Hirsch
Attorney, Agent, or Firm—Glenn K. Robbins

[57] ABSTRACT

A catfish holder for killing and cleaning catfish. The holder is comprised of a flat board-like member supporting the body of the catfish and a positioning and restraining box-like member to hold the head of the catfish. A hinged plate on the top of the box-like structure holds a spike which is adapted to be driven into the head of the catfish by a handle connected to the hinged plate. The top of the box-like structure serves as a stop to prevent the spike from being driven into the board while the handle is rotatable to be rotated out of the way in the fish cleaning operation.

1 Claim, 6 Drawing Figures

COMBINED CATFISH KILLER AND HOLDER

BACKGROUND OF THE INVENTION

It is a sometimes hazardous and difficult task to clean catfish. Extreme caution is required due to the long and sharp pectoral and dorsal fins or barbs of the catfish which can deliver painful, irritating and sometimes poisonous wounds to anyone handling catfish.

The most common means for cleaning catfish in the field is through the use of a common nail or a spike which is an effective way to restrain the head of the catfish by driving the nail through the head with a hammer onto a board underneath the fish. This is difficult to do efficiently, since the fish cleaner needs to hold the fish, hold the nail and drive the hammer all at the same time.

By means of the instant invention an improved and highly efficient device for holding a catfish safely for skinning and cleaning has been devised. Use of the catfish holder of this invention enables a person to drive a nail or spike simply through the head of the catfish while restraining the head and impale the catfish on a flat board-like member which serves as a base for the catfish. Once safely impaled the catfish is generally killed quickly and is restrained for the conventional skinning and cleaning operation. This is accomplished in the usual fashion by taking a sharp knife and cutting through the skin in front of the dorsal fin and at the rear of the head and down at the sides and back of the barbs or pectoral fins. Pliers are used to pull the skin off and then the fish is gutted and the head may be simply cut off.

The catfish holder is comprised of a simple structure made up of a flat board-like member and a positioning and restraining member which is of a box-like structure for holding the head of the catfish and restraining flopping back and forth movement of the fish. This positioning box-like structure has a U-shaped wall construction which serves as a stop for the front of the head while the side walls restrain the sidewise movement of the head.

The box-like head restraining structure further is provided with a hinge plate at the top which holds a spike which is operated in a rotary fashion to impale the head of the catfish by a handle rotably supported on the plate-like member. The spike need be moved only through a short arc of about 30° so that the angle of entry is essentially vertical for a fast and efficient thrust. The handle is rotatable out of the way of the person skinning and cleaning the fish after the impaling of the head is effected.

The top of the box-like structure further serves as a rest or stop for the plate-like member which holds the spike. Thus the spike when operated is stopped short of the board or just barely meets it. In this fashion great force can be brought to bear through the handle with automatic stop means for the spike through the engagement of the plate-like member and the top of the box-like head restraining structure.

The above features are objects of this invention and further objects will appear in the detailed description which follows and will otherwise be apparent to those skilled in the art.

For the purpose of illustration of this invention there is shown in the accompanying drawings a preferred embodiment thereof. It is to be understood that these drawings are for the purpose of example only and that the invention is not limited thereto.

IN THE DRAWINGS

DESCRIPTION OF THE INVENTION

Figure 1:
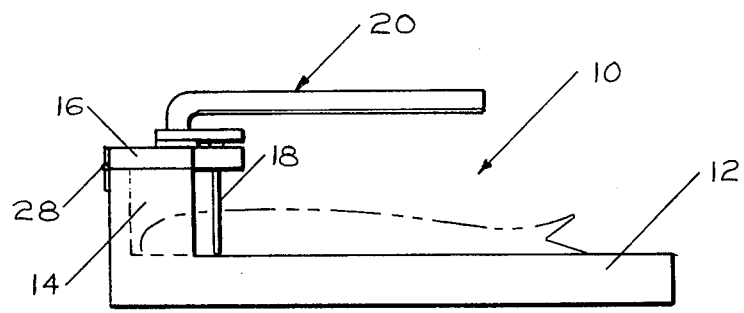
FIG. 1, is a view in side elevation of the catfish holder with a fish shown in dotted lines.
Figure 2:
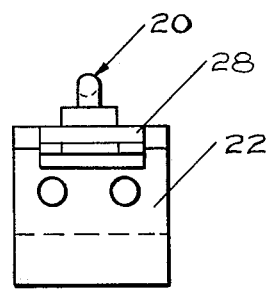
FIG. 2, is a view in front elevation of the holder.

The catfish holder of this invention is generally indicated by the reference numeral 10 in FIGS. 1 through 5. It is comprised of a flat base 12 a fish head positioning and restraining member 14 and a hinged plate 16 supporting a spike 18 and rotatable handle 20.

Figure 3:
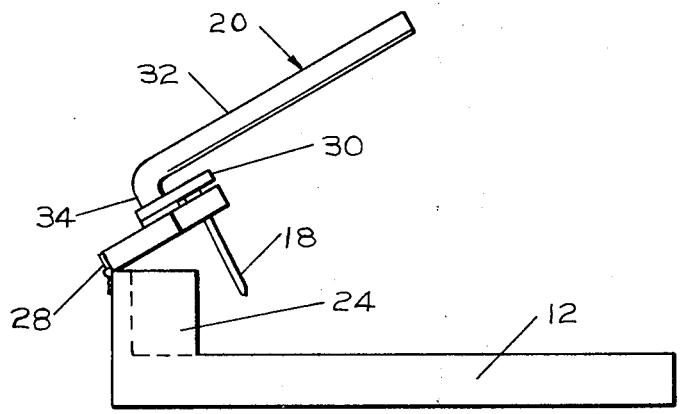
FIG. 3, is a view taken similarly to FIG. 1 showing the handle and spike moved to permit placing of the fish onto the holder.
Figure 4:
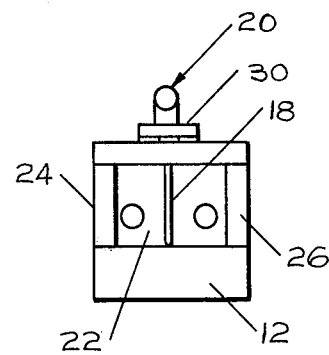
FIG. 4, is a view in rear elevation of the holder.
Figure 5:
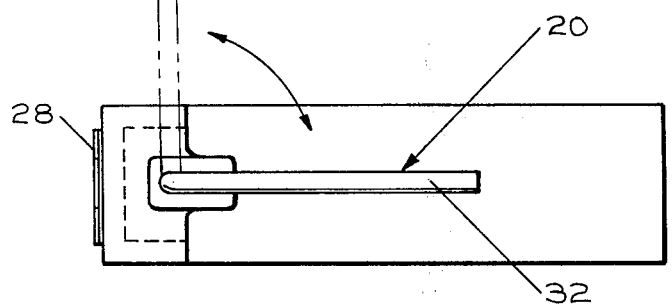
FIG. 5, is a top plan view of the holder.
Figure 6:
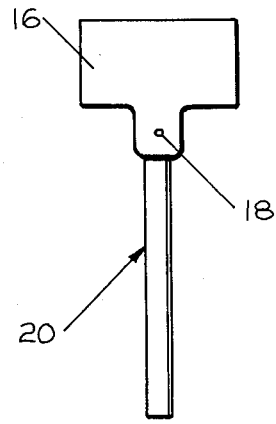
FIG. 6 is a fragmentary bottom plan view of the hinged plate-like member supporting the spike and the handle.

The flat base 12 supports the fish upon it for ready handling and cleaning while the head positioning and restraining member 14 holds the head from flopping around in the fish killing and cleaning operation. The head restraining member 14 is comprised of a U-shaped box-like structure having an upstanding vertical end wall 22 and side walls 24 and 26 as best shown in FIGS. 3, 4 and 5. The end wall 22 serves as a stop against which the head of the catfish can be placed.

The hinged plate 16 is connected by a hinge 28 to the top of the end wall 22. This plate rests upon edges of all of the U-shaped walls 22, 24 and 26 as best shown in FIGS. 1 and 4.

The spike 18 is connected to the plate 16 by means of a stop plate 30 but it will be understood that other means of connecting the spike to the plate can be used as desired.

The handle 20 is of an L-shaped nature having a handle portion 32 and a short arm 34 which is connected to the plate through the stop plate 30 and is journalled therein by conventional means forming no part of this invention. The handle may be rotated as shown in dotted lines in FIG. 5 to a right angle position away from the base 2 and out of the way in the fish cleaning operation.

Use

The catfish holder of this invention is very simply adapted for use even for those relatively inexperienced in fish cleaning. In the cleaning operation the catfish is first of all placed on the flat base 12 with its head inside the positioning and restraining structure 14 to the point where it butts against the end wall 22. This is effected with the handle 20 operated in the open position shown in FIG. 3.

Once the catfish has been placed in the afore-mentioned and described position with the head properly positioned underneath the spike 18, the handle 20 is brought downward with as much force as required to the position shown in FIG. 1. The spike 18 is caused to enter the head of the fish and in the proper placement is driven through the head of the fish to kill it as efficiently as possible. The fish is restrained through the box-like structure 14 from moving the head to any great degree which greatly facilitates the restraining and ultimate cleaning of the fish.

In the cleaning operation after the fish is impaled with the spike in the above described manner the handle is then moved out of the way. A sharp knife is then used to cut through the skin in front of the dorsal fin and down the sides and back of the pectoral fins or barbs of the catfish. After this is accomplished, pliers are employed to pull the skin towards the rear and off the fish. The fish is then gutted and the head is cut off to complete the fish cleaning operation.

The use of the holder provides a simple and efficient way of killing and cleaning catfish. It can be employed without the requirement of great skill and serves in a humane way to kill the fish as rapidly as possible and facilitate the cleaning.

Various changes and modifications may be made within this invention as will readily apparent to those skilled in the art. Such changes and modifications are within the scope and teaching of this invention as defined by the claims appended hereto.

What is claimed is:

1. A catfish holder for cleaning catfish, said holder comprising a flat base member, a positioning and restraining member for the head of the catfish, said positioning member comprising a vertical transverse member which serves as a stop for the front of the head and a pair of spaced and opposed side wall members for restraining side movement of the head and piercing means for piercing the head of the catfish and impaling the head to pin the head to the holder while cleaning the fish comprising a spike means hingedly mounted to the positioning member spaced a substantial distance above the base member and a handle provided to drive the spike from a head disengaged position to a head engaged position, said spike means comprising a rigid plate-like member hingedly mounted to one of said wall members above the base and a spike fixed to the bottom of said plate-like member, said plate-like member being hingedly mounted on said transverse member above the base member and in a rest position being supported on top portions of said side wall members and said spike in the rest position being hingedly spaced closely above the flat base member.

* * * * *